US012619686B2

(12) United States Patent
Udaya et al.

(10) Patent No.: US 12,619,686 B2
(45) Date of Patent: May 5, 2026

(54) SOFTWARE PACKAGE SHARING TO RESTRICTED LANDSCAPES

(71) Applicant: SAP SE, Walldorf (DE)

(72) Inventors: Sahana Durgam Udaya, Bangalore (IN); Prasadh S, Madurai (IN)

(73) Assignee: SAP SE, Walldorf (DE)

( * ) Notice: Subject to any disclaimer, the term of this patent is extended or adjusted under 35 U.S.C. 154(b) by 396 days.

(21) Appl. No.: 18/133,866

(22) Filed: Apr. 12, 2023

(65) Prior Publication Data

US 2024/0346116 A1 Oct. 17, 2024

(51) Int. Cl.
*G06F 21/12* (2013.01)
*G06F 8/65* (2018.01)
*G06F 21/10* (2013.01)

(52) U.S. Cl.
CPC ............... *G06F 21/12* (2013.01); *G06F 8/65* (2013.01); *G06F 21/1015* (2023.08)

(58) Field of Classification Search
CPC combination set(s) only.
See application file for complete search history.

(56) References Cited

U.S. PATENT DOCUMENTS

| | | | | |
|---|---|---|---|---|
| 11,204,758 B1 * | 12/2021 | Vattikuti | ............. | G06F 11/3006 |
| 11,853,317 B1 * | 12/2023 | Goyal | ................. | G06F 16/2477 |
| 2020/0117725 A1 * | 4/2020 | Bhattacharya | ......... | G06Q 10/10 |
| 2021/0328998 A1 * | 10/2021 | Mangayil | .............. | H04L 63/105 |
| 2022/0345441 A1 * | 10/2022 | Tanba | ................. | H04L 61/3015 |
| 2023/0281064 A1 * | 9/2023 | Hsu | ..................... | G06F 21/6218 |
| | | | | 709/201 |

FOREIGN PATENT DOCUMENTS

| | | | | |
|---|---|---|---|---|
| CN | 103593447 B | * | 2/2017 | ....... G06F 17/30368 |

\* cited by examiner

*Primary Examiner* — Nasser M Goodarzi
(74) *Attorney, Agent, or Firm* — SCHWEGMAN LUNDBERG & WOESSNER, P.A.

(57) ABSTRACT

In an example embodiment, an alternative technical method for sharing a public package to a restricted landscape that avoids a content manager service (CMS) making a call to a tenant management service (TMS). This overcomes any issues involved with the CMS making the call to the TMS, while still permitting the sharing of public packages within the restricted landscape. More particularly, a poll-pull based mechanism is introduced where the restricted CMS periodically polls and checks for any packages shared with it from a public CMS and, if found, pulls the tenant FQDN from the public CMS. The restricted CMS will then fire a request to the TMS to retrieve the tenant metadata.

20 Claims, 8 Drawing Sheets

400

| USER 402 | RESTRICTED CMS 404 | RESTRICTED TMS 406 | PUBLIC CMS 408 |

SHARE PACKAGE

410

STORE PACKAGE AND TENANT DETAILS IN INTERIM TABLE

412

CONNECT

PERIODICALLY CHECK FOR PACKAGES SHARED WITH TENANT(S)

414

420

SCAN INTERIM TABLE FOR PACKAGES

416

REQUEST TENANT DETAILS

RETURN SHARED PACKAGES AND FQDNS

418

RETURN TENANT DETAILS

422

UPDATE PACKAGE SHARE STATUS

424

426

UPDATE PERMISSION TABLE

CLEAR ENTRY FROM INTERIM TABLE

502
PERIODICALLY SEND REQUEST TO PUBLIC CMS TO CHECK FOR PACKAGES

504
RECEIVE TENANT METADATA

506
USE TENANT METADATA TO OBTAIN TENANT DETAILS FROM TMS

508
CAUSE PUBLIC CMS TO UPDATE SHARING PERMISSIONS FOR THE TENANT(S)

600

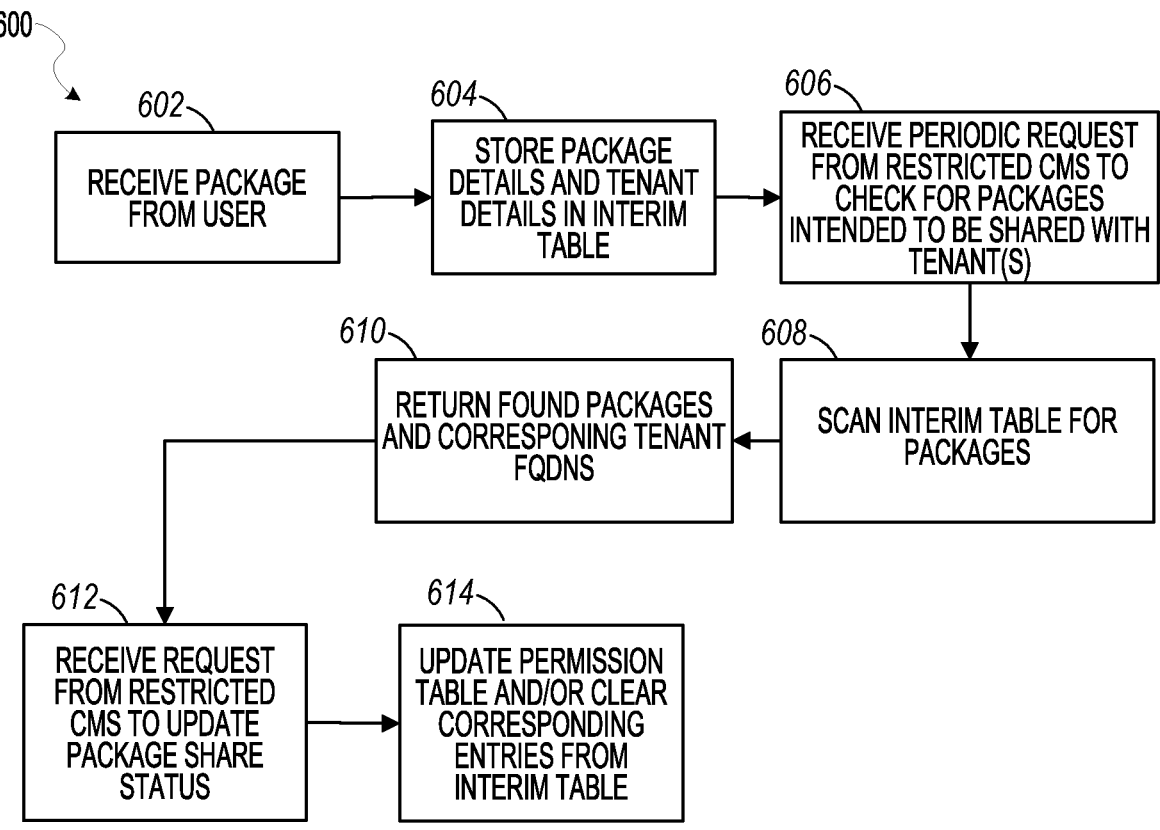

602

RECEIVE PACKAGE FROM USER

604

STORE PACKAGE DETAILS AND TENANT DETAILS IN INTERIM TABLE

606

RECEIVE PERIODIC REQUEST FROM RESTRICTED CMS TO CHECK FOR PACKAGES INTENDED TO BE SHARED WITH TENANT(S)

610

RETURN FOUND PACKAGES AND CORRESPONING TENANT FQDNS

608

SCAN INTERIM TABLE FOR PACKAGES

612

RECEIVE REQUEST FROM RESTRICTED CMS TO UPDATE PACKAGE SHARE STATUS

614

UPDATE PERMISSION TABLE AND/OR CLEAR CORRESPONDING ENTRIES FROM INTERIM TABLE

*FIG. 6*

SOFTWARE PACKAGE SHARING TO RESTRICTED LANDSCAPES

TECHNICAL FIELD

This document generally relates to computer software analytics software. More specifically, this document relates to software package sharing to restricted landscapes.

BACKGROUND

Analytics software allows individuals and entities such as businesses to obtain various analytics content, such as summaries, predictions, models, stories, visualizations, and value-driver trees (VDTs), typically regarding functioning of an organization. An example of analytics software is the SAP Analytics Cloud™ (SAC), from SAP SE of Walldorf, Germany, which combines business intelligence, planning, and predictive capabilities. In any business intelligence/analytics platform, the analytics content plays a central role in discovering the unseen patterns in an organization. Hence, sharing of the analytics content across users is very helpful for better collaboration. Additionally, standard content templates can be reused by different users, who may then have those templates applied to their own data. The infrastructure for sharing analytics content is an Analytical Content Network (ACN). Shared SAC content is called a "package."

BRIEF DESCRIPTION OF DRAWINGS

The present disclosure is illustrated by way of example and not limitation in the figures of the accompanying drawings, in which like references indicate similar elements.

FIG. 4 is a sequence diagram illustrating an alternative method for sharing a public package, in accordance with an example embodiment.

FIG. 6 is a flow diagram illustrating another method for sharing a public package with a restricted CMS, in accordance with an example embodiment.

DETAILED DESCRIPTION

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

An ACN is a global content network, which can provision or share any SAC content. It can also be connected to any SAC tenant, allowing it to provision and share content to individual SAC tenants as well.

An SAC content creator can create SAC content in the form of stories, models, dimensions, connections, VDTs, and so forth. If authorized, the SAC content creator can then export this content from the SAC tenant to ACN by creating a content package, which can contain any number of these content items. The package can then be shared with multiple other tenants.

An SAC content user (a user who can consume or interact with content) can view all available content packages in their listing and import those packages relevant for their analytic workflows. This includes public content (templates or demo content) and private content (shared privately with them).

The packages themselves are essentially pre-built collections of dashboards, reports, data models, and other analytics content that are designed to help organizations quickly gain insights and make better decisions based on their data.

Figure 1:
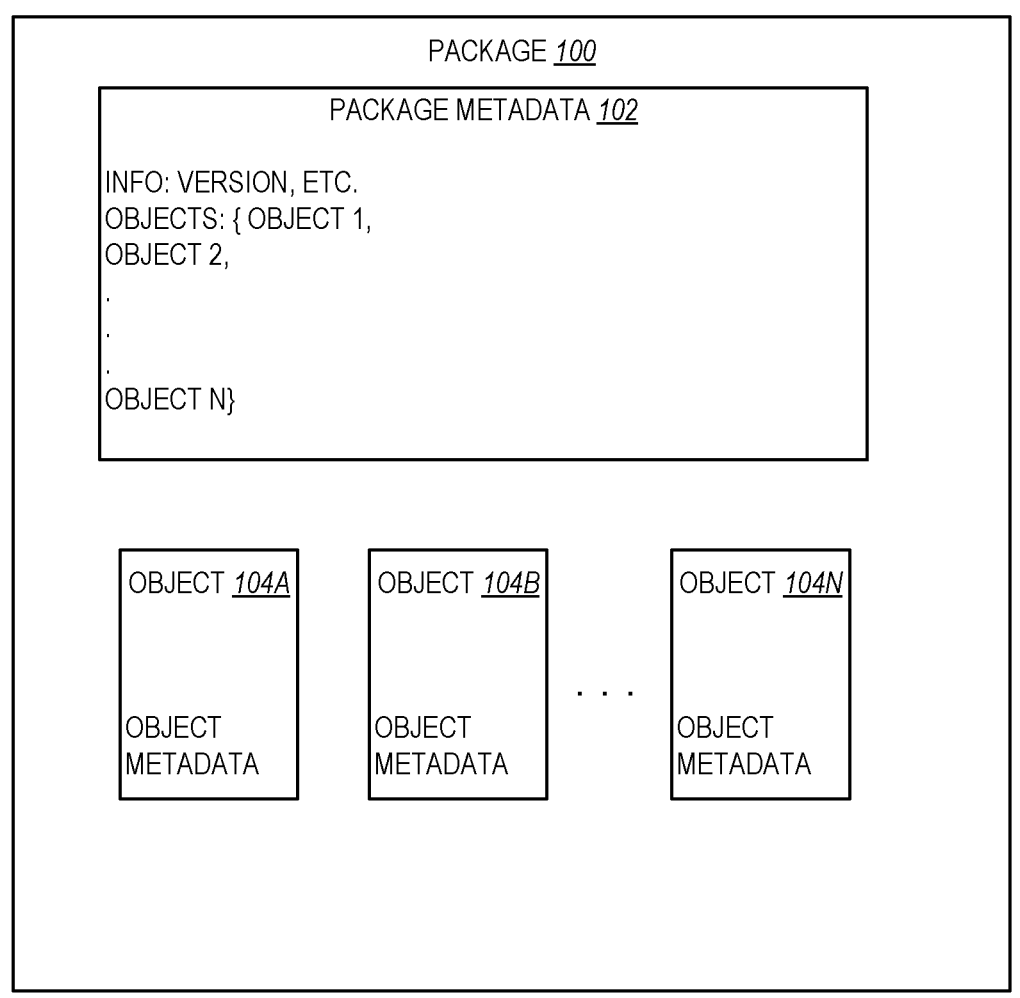
FIG. 1 is a block diagram illustrating the structure of a package, in accordance with an example embodiment.

The package contains the details of each object present in the package, the dependency information between those objects, and an overview which summarizes the content details. FIG. 1 is a block diagram illustrating the structure of a package 100, in accordance with an example embodiment. As can be seen, the package includes package metadata 102, and a plurality of objects 104A-104N.

The package metadata 102 may include information about the package, the objects, and the dependencies among the objects. The following is an example of package metadata, in accordance with an example embodiment.

```
{
    "info": {
        /* Package version information */
    },
    "objects": [
        {
            "objectType" :   "RESOURCE",
            "objectName" :   "Annual Reports",
            "objectId" : "objectIdA",
            "parentResId" :   "PUBLIC",
            "ancestorPath"  :   [ ]
        },
        {
            "objectType" :   "RESOURCE",
            "objectName" :   "New Story",
            "objectId" : "objectIdC",
            "parentResId":    "objectIdB",
            "ancestorPath"  :   [ ]
        },
        {
            "objectType" :   "RESOURCE",
            "objectName" :   "Finance Reports",
            "objectId" :   "objectIdB",
            "parentResId" : "objectIdA",
            "ancestorPath"  :   [ ]
        }
    ]
}
```

Figure 2:
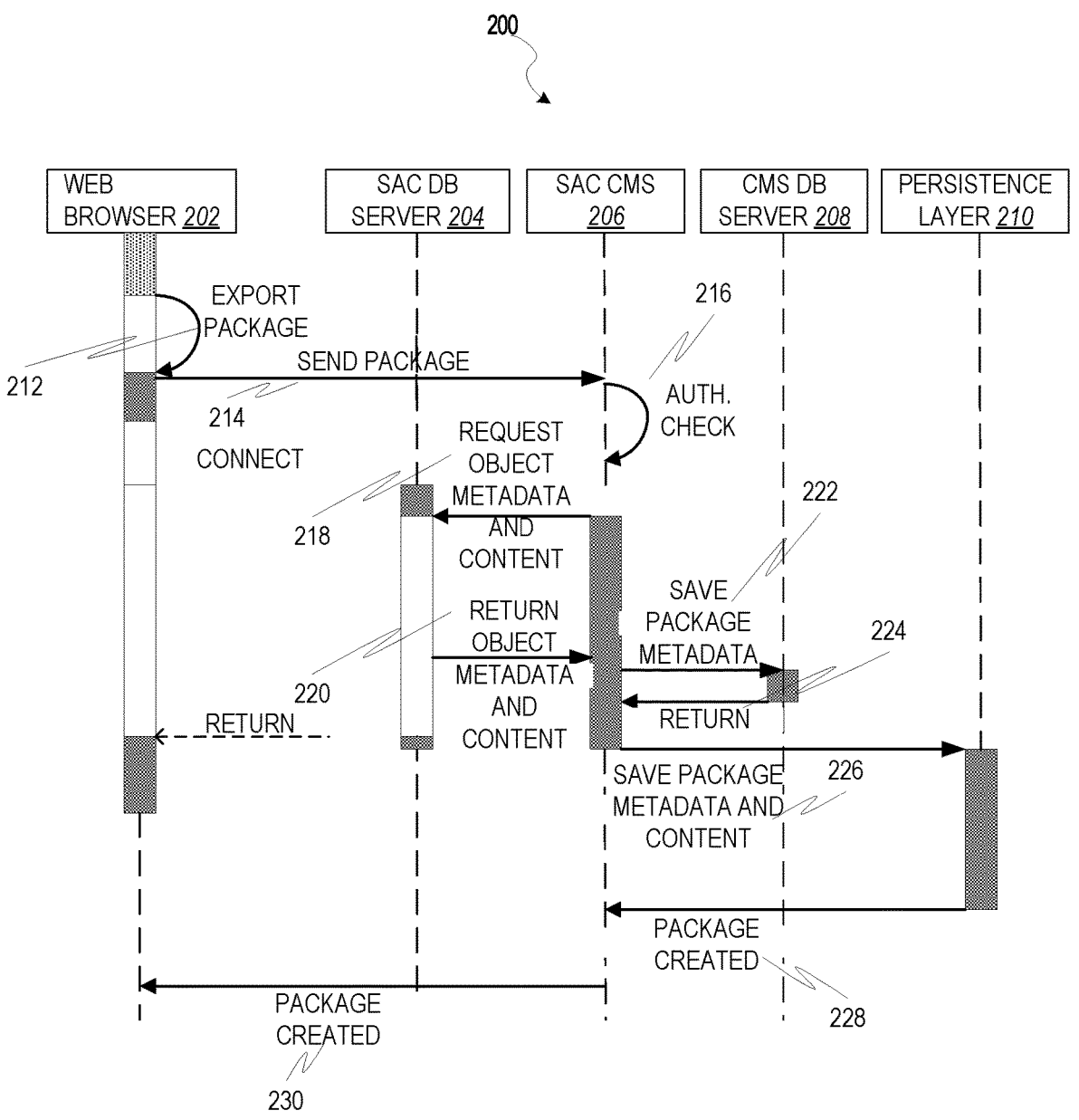
FIG. 2 is a sequence diagram illustrating a method of how a package is created.

FIG. 2 is a sequence diagram illustrating a method 200 of how a package is created. The method 200 utilizes a web browser 202, SAC database server 204, SAC ContentManager Service (CMS 206, CMS database server 208, and persistence layer 210).

At operation 212, the web browser 202 initiates an export package command. This causes the package details to be sent to the SAC CMS 206 at operation 214. At operation 216, the SAC CMS 206 checks to make sure the user is authorized to share the public package. If so, then at operation 218, the SAC CMS 206 requests object metadata and object content for the package from the SAC database server 204, which is returned at operation 220.

At operation 222, the SAC CMS 206 saves the package metadata to the CMS database server 208, which responds at operation 224. The SAC CMS 206 then saves the package metadata and package content to persistence layer 210 at operation 226, which responds at operation 228 with an indication that the package has been created. The SAC CMS 206 then notifies the web browser 202 of the package creation at operation 230.

This process can be used to share the package with desired tenants, who then can benefit from its content.

The package itself can contain a variety of content, such as story, model, connection, etc., including sample help to allow the tenant to get started, and content for specific industries and lines of business to help the tenant set up and enhance various scenarios. These tenants then need not worry about building, developing, and maintaining a complex dashboard.

A public repository, also called a landscape, may be designated for managing public packages. Some repositories, however, are not completely public, but allow public users to download stored packages subject to some sort of restriction, such as legal restrictions.

Figure 3:
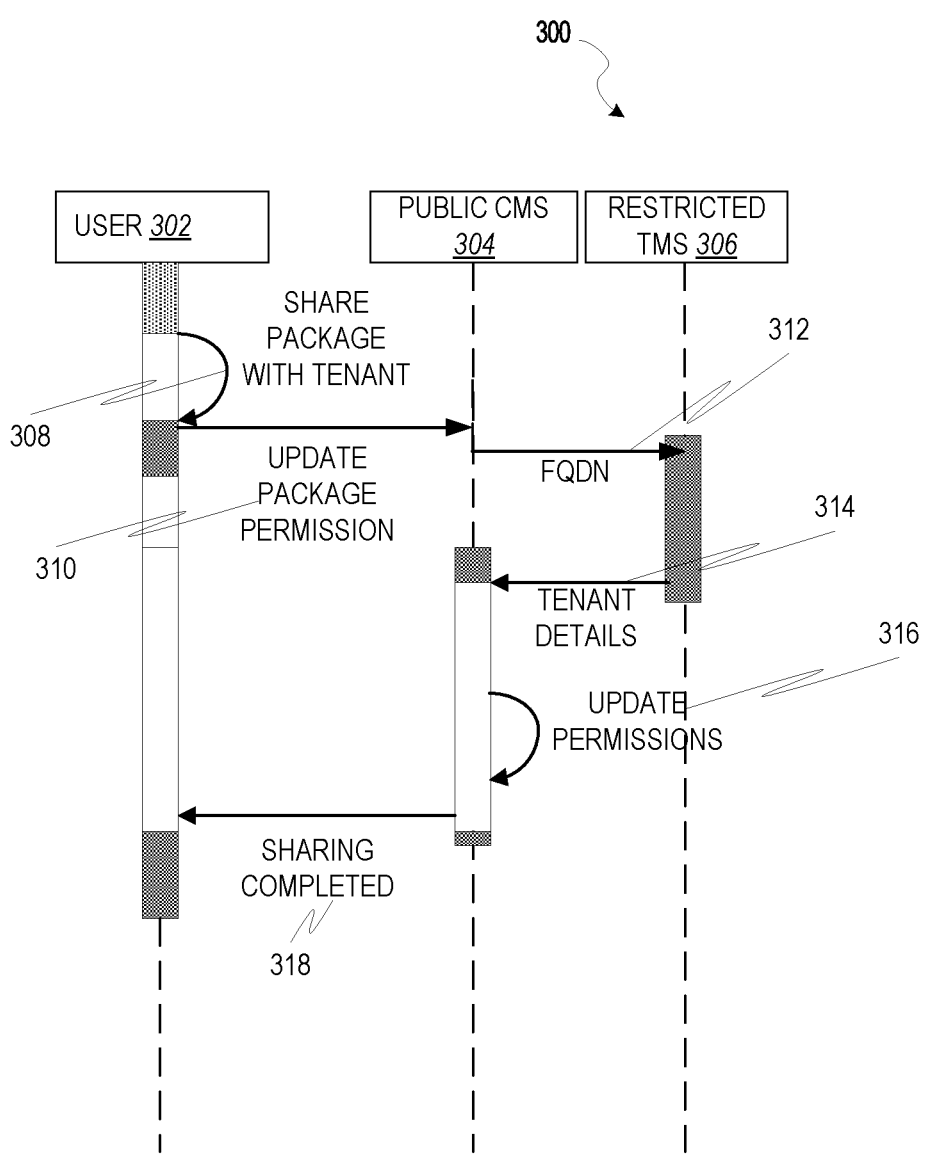
FIG. 3 is a sequence diagram illustrating a method for sharing a public package, in accordance with an example embodiment.

FIG. 3 is a sequence diagram illustrating a method 300 for sharing a public package, in accordance with an example embodiment. The method involves a user 302, a public CMS 304, and a restricted tenant management service (TMS) 306. At operation 308, the user 302 initiates a command to share the package with a tenant. The user provides a fully qualified domain name (FQDN) of a tenant with which the package is to be shared, along with a request to update package permission, to the public CMS 304 at operation 310. Then, at operation 312, public CMS 304 sends the FQDN to restricted TMS 306 to obtain tenant details, which are returned at operation 314. Public CMS 304 then updates the permission at operation 316, by, for example, adding the tenant's universal unique identifier (UUID) to a local table. CMS 304 then notifies the user 302 that the sharing has been completed, at operation 318.

A technical issue, however, is encountered with this approach when the landscape of the TMS is in a restricted zone, as the CMS (in a non-restricted zone) cannot request information from the restricted TMS. When the landscape is restricted in some way, but still generally open to members of the public, it may be termed "restricted" in contrast to "public" which is when the landscape is open to members of the public without restriction. It can also be contrasted to "private" which is a landscape that is not open to members of the public.

More particularly, a restricted TMS is a type of TMS that limits access to certain content, features, or functionality to authorized users only. In other words, a restricted TMS is a TMS that has been configured to control who can, or how they can, access, modify, and publish content on the website or application it manages.

A restricted TMS typically uses user authentication and access control mechanisms to ensure that only authorized users can access specific parts of the system. For example, a restricted TMS might have different user roles, such as "editor," "contributor," and "administrator," with each role having different levels of access to the system's features and content.

Restricted TMS systems are commonly used in organizations or applications where there is a need to control access to sensitive or confidential information, such as medical records, financial data, or other types of private information. These systems ensure that only authorized individuals have access to the information, reducing the risk of data breaches or unauthorized access.

While a restricted TMS provides greater control over who can access and modify content, it may also require additional resources and time to manage user accounts, permissions, and access controls. The specific restrictions and access controls implemented in a restricted TMS will depend on the specific needs of the organization or application.

One such restriction that may be in use in a restricted landscape involves the European Union Data Protection (EUDP), which legally prohibits the public CMS 304 from making a call to the restricted TMS 306 due to a prohibition against operations from a non-EU region to EU region. Data from EU region should be accessible to non-EU region after consent from EU region.

More particularly, the EDUP has a number of requirements that pertain to the protection of personal data, including:

(1) Lawful basis for processing: The CMS must have a lawful basis for processing personal data. This means that the organization must have a valid reason for collecting and processing personal data and must be able to demonstrate that the processing is necessary for a specific purpose.

(2) Data minimization: The CMS must collect and process only the minimum amount of personal data necessary to achieve the intended purpose. This means that unnecessary or irrelevant data should not be collected or shared.

(3) Consent: If personal data is being shared publicly, the CMS must obtain consent from the individuals whose data is being shared. The consent must be freely given, specific, informed, and unambiguous.

(4) Transparency: The CMS must provide clear and concise information about the processing of personal data, including the purpose of the processing, the legal basis for the processing, and any third parties with whom the data may be shared.

(5) Security: The CMS must ensure that appropriate security measures are in place to protect personal data from unauthorized access, alteration, or destruction. This includes the use of encryption, access controls, and regular monitoring and testing of security systems.

(6) Data subject rights: The CMS must ensure that individuals whose personal data is being processed have the right to access their data, request its deletion, and request corrections to any inaccurate data.

In an example embodiment, an alternative technical method is used for sharing a public package to a restricted landscape that avoids a CMS making a call to a TMS. This overcomes any issues involved with the public CMS making the call to the restricted TMS, while still permitting the sharing of public packages within the restricted landscape. More particularly, a poll-pull based mechanism is introduced where the restricted CMS periodically polls and checks for any packages shared with it from a public CMS and, if found, pulls the tenant FQDN from the public CMS. The restricted CMS will then fire a request to the TMS to retrieve the tenant metadata.

FIG. 4 is a sequence diagram illustrating an alternative method 400 for sharing a public package, in accordance with an example embodiment. This alternative method 400 involves a user 402, restricted CMS 404, restricted TMS 406, and public CMS 408. Rather than public CMS 408 directly initiating a call to restricted TMS 406, it saves the share information in an interim table in public CMS 408, the user 402, at operation 410, shares the package (and the tenant FQDN) with restricted tenant 408. At operation 412, the public CMS stores package details and tenant details in an interim table.

On a periodic basis (e.g., every hour or every day), the restricted CMS 404 checks for any packages stored by the public CMS 408 that are shared to any tenants associated with TMS 406, at operation 414. At operation 416, the public CMS 408 scans the interim table for any such packages and returns them (and their corresponding tenant FQDNs), at operation 418.

At operation 420, the restricted CMS 404 then requests tenant details from TMS 406 using the FQDN(s) returned by the public CMS 408. At operation 422, the tenant details are returned. These tenant details may include tenant metadata such as UUID, Original Equipment Manufacturer (OEM) identifiers, and so forth.

At operation 424, the restricted CMS 404 then sends a request to the public CMS 408 to update package share status by sending the tenant details. At operation 426, the public CMS 408 updates a permission table to reflect the sharing status, using the tenant details, and at operation 428, the public CMS 408 clears the corresponding entry or entries from the interim table.

Communication between the restricted CMS 404 and the TMS 406 may be in one of any number of different communication protocols. One such example is application programming interfaces (APIs). Another such example is Extensible Markup Language (XML), which is a markup language for encoding documents in a format that is both human-readable and machine-readable. Another such example is a Translation Memory exchange (TMX), which is a format used for the exchange of translation memories (databases of previously translated content). Another such example is XML Localization Interchange File Format (XLIDD), which is a format for the exchange of localization data between different tools and systems.

The restricted CMS 404 may store data in an associated SAC database server. In an example embodiment, the SAC database server may store data in an in-memory database. An in-memory database (also known as an in-memory database management system) is a type of database management system that primarily relies on main memory for computer data storage. It is contrasted with database management systems that employ a disk storage mechanism. In-memory databases are traditionally faster than disk storage databases because disk access is slower than memory access. One example in-memory database is the HANA® database from SAP SE, of Walldorf, Germany.

While the above solution is described in the context of solving the technical problems introduced by the EUDP with respect to public packages, the solution can actually be used in any scenario where communication between a restricted service and open (public) service is difficult, undesirable, or not possible. For example, there may be no direct communication link between the restricted service and open (public) service, or the communication link that is available may be busy or too slow to perform well enough for the quality of service needed for an application the user is using. The above solution therefore works in these scenarios as well, and nothing in this disclosure shall be interpreting as limiting the scenarios in which the solution is implemented to only ones where the restricted service is subject to the EUDP.

Figure 5:
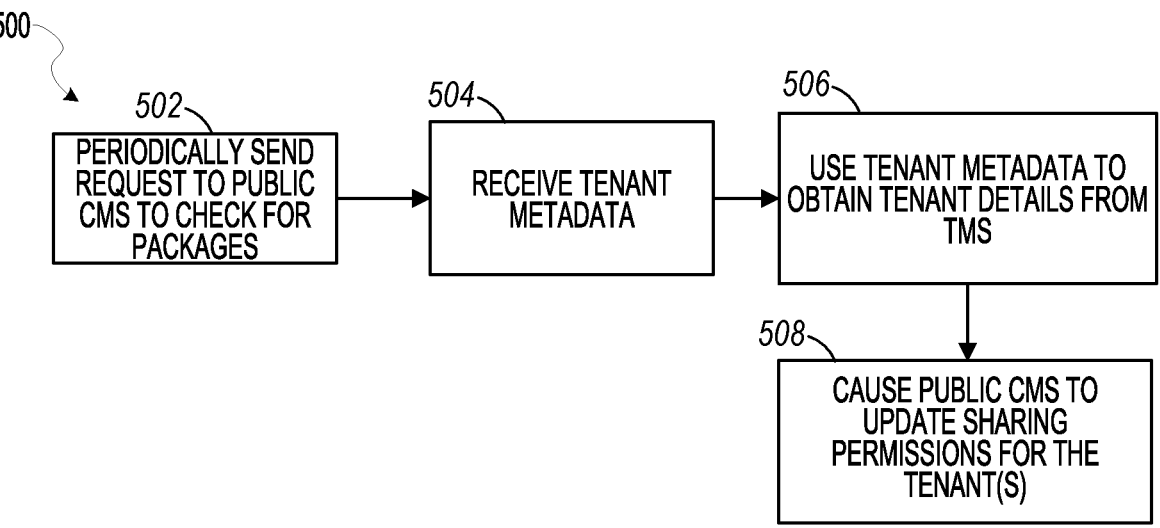
FIG. 5 is a flow diagram illustrating a method for sharing a public package with a restricted ContentManager Service (CMS), in accordance with an example embodiment

FIG. 5 is a flow diagram illustrating a method 500 for sharing a public package with a restricted CMS, in accordance with an example embodiment. The method 500 is performed at the restricted CMS. At operation 502, the restricted CMS periodically sends a request to a public CMS to check for packages shared with a tenant of a TMS associated with the restricted content manager service. This may include requesting or otherwise causing the public CMS to check for any packages in the interim table that have associated FQDNs (indicating tenants to share the packages with) that match FQDNs of the tenant management service. The period of the periodic sending may be set at any time value (e.g., one hour, one day, etc.). The public CMS stores, for a shared package, package details and tenant details corresponding to one or more tenants with which the package is to be shared in an interim table.

At operation 504, in response to the periodic sending, tenant metadata is received for any tenants, associated with the restricted CMS, with which the public content manager service determines one or more packages have been shared. The tenant metadata may include a UUID for any tenant with which the packages are to be shared.

At operation 506, the tenant metadata is used to obtain tenant details from the TMS associated with the restricted content manager service. At operation 508, the public CMS is caused to update sharing permissions for one or more tenants corresponding to the tenant details by passing the tenant details to the public CMS. This may include the public CMS updating a permission table with the tenant details and/or clearing any entries associated with the package details from the interim table.

FIG. 6 is a flow diagram illustrating another method 600 for sharing a public package with a restricted CMS, in accordance with an example embodiment. The method 600 is performed at a public CMS. At operation 602, the public CMS receives a package from a user, with the package intended to be shared with a tenant of a TMS associated with the restricted CMS. At operation 604, the public CMS stores package details and tenant details in an interim table. This may be stored in, for example, an in-memory database. The tenant details may include, for example, the FQDN of any tenant in which the package is intended to be shared.

At operation 606, the public CMS may receive a periodic request (aka, poll) from the restricted CMS to check for any packages that are intended to be shared with a tenant of a TMS associated with the restricted CMS. At operation 608, in response to the receipt of the periodic request, the public CMS may scan the interim table for any such packages. Any that are found may have their corresponding tenant FQDNs returned to the restricted CMS at operation 610.

At operation 612, the public CMS receives a request from the restricted CMS to update the package share status. At operation 614, in response to the request in operation 612, the public CMS updates the permission table and/or clears any corresponding entries from the interim table.

In view of the disclosure above, various examples are set forth below. It should be noted that one or more features of an example, taken in isolation or combination, should be considered within the disclosure of this application.

Example 1. A system comprising:

at least one hardware processor; and a computer-readable medium storing instructions that, when executed by the at least one hardware processor, cause the at least one hardware processor to perform operations comprising:

periodically sending a request from a restricted content manager service to a public content manager service to check for packages shared with a tenant of a tenant management service associated with the restricted content manager service;

in response to the periodic sending, receiving tenant metadata for one or more tenants with which the public content manager service determines one or more packages have been shared, the one or more tenants associated with the restricted content manager service;

obtaining tenant details from the tenant management service associated with the restricted content manager service, based on the tenant metadata; and causing the public content manager service to update sharing permissions for one or more tenants corresponding to the tenant details by passing the tenant details to the public content manager service.

Example 2. The system of Example 1, wherein the public content manager service stores, for a shared package, package details and tenant details corresponding to one or more tenants with which the package is to be shared, in an interim table.

Example 3. The system of Example 2, wherein the causing results in the public content manager service updating a permission table with the tenant details.

Example 4. The system of Example 3, wherein the causing further results in the public content manager service clearing any entries associated with the package details from the interim table.

Example 5. The system of any of Examples 1-4, wherein the tenant details include a FQDN of any tenant with which the packages are to be shared.

Example 6. The system of any of Examples 1-5, wherein the tenant metadata includes a UUID for any tenant with which the packages are to be shared.

Example 7. The system of any of Examples 2-4, wherein the interim table is stored in an in-memory database.

Example 8. A method comprising:

periodically sending a request from a restricted content manager service to a public content manager service to check for packages shared with a tenant of a tenant management service associated with the restricted content manager service;

in response to the periodic sending, receiving tenant metadata for one or more tenants with which the public content manager service determines one or more packages have been shared, the one or more tenants associated with the restricted content manager service;

obtaining tenant details from the tenant management service associated with the restricted content manager service, based on the tenant metadata; and causing the public content manager service to update sharing permissions for one or more tenants corresponding to the tenant details by passing the tenant details to the public content manager service.

Example 9. The method of Example 8, wherein the public content manager service stores, for a shared package, package details and tenant details corresponding to one or more tenants with which the package is to be shared in an interim table.

Example 10. The method of Example 9, wherein the causing results in the public content manager service updating a permission table with the tenant details.

Example 11. The method of Example 10, wherein the causing further results in the public content manager service clearing any entries associated with the package details from the interim table.

Example 12. The method of any of Examples 8-11, wherein the tenant details include a FQDN of any tenant with which the packages are to be shared.

Example 13. The method of any of Examples 8-12, wherein the tenant metadata includes a UUID for any tenant with which the packages are to be shared.

Example 14. The method of any of Examples 9-11, wherein the interim table is stored in an in-memory database.

Example 15. A non-transitory machine-readable medium storing instructions which, when executed by one or more processors, cause the one or more processors to perform operations comprising:

periodically sending a request from a restricted content manager service to a public content manager service to check for packages shared with a tenant of a tenant management service associated with the restricted content manager service;

in response to the periodic sending, receiving tenant metadata for one or more tenants with which the public content manager service determines one or more packages have been shared, the one or more tenants associated with the restricted content manager service;

obtaining tenant details from the tenant management service associated with the restricted content manager service, based on the tenant metadata; and causing the public content manager service to update sharing permissions for one or more tenants corresponding to the tenant details by passing the tenant details to the public content manager service.

Example 16. The non-transitory machine-readable medium of Example 15, wherein the public content manager service stores, for a shared package, package details and tenant details corresponding to one or more tenants with which the package is to be shared, in an interim table.

Example 17. The non-transitory machine-readable medium of Example 16, wherein the causing results in the public content manager service updating a permission table with the tenant details.

Example 18. The non-transitory machine-readable medium of Example 17, wherein the causing further results in the public content manager service clearing any entries associated with the package details from the interim table.

Example 19. The non-transitory machine-readable medium of any of Examples 15-18, wherein the tenant details include a FQDN of any tenant with which the packages are to be shared.

Example 20. The non-transitory machine-readable medium of any of Examples 15-19, wherein the tenant metadata includes a UUID for any tenant with which the packages are to be shared.

Figure 7:
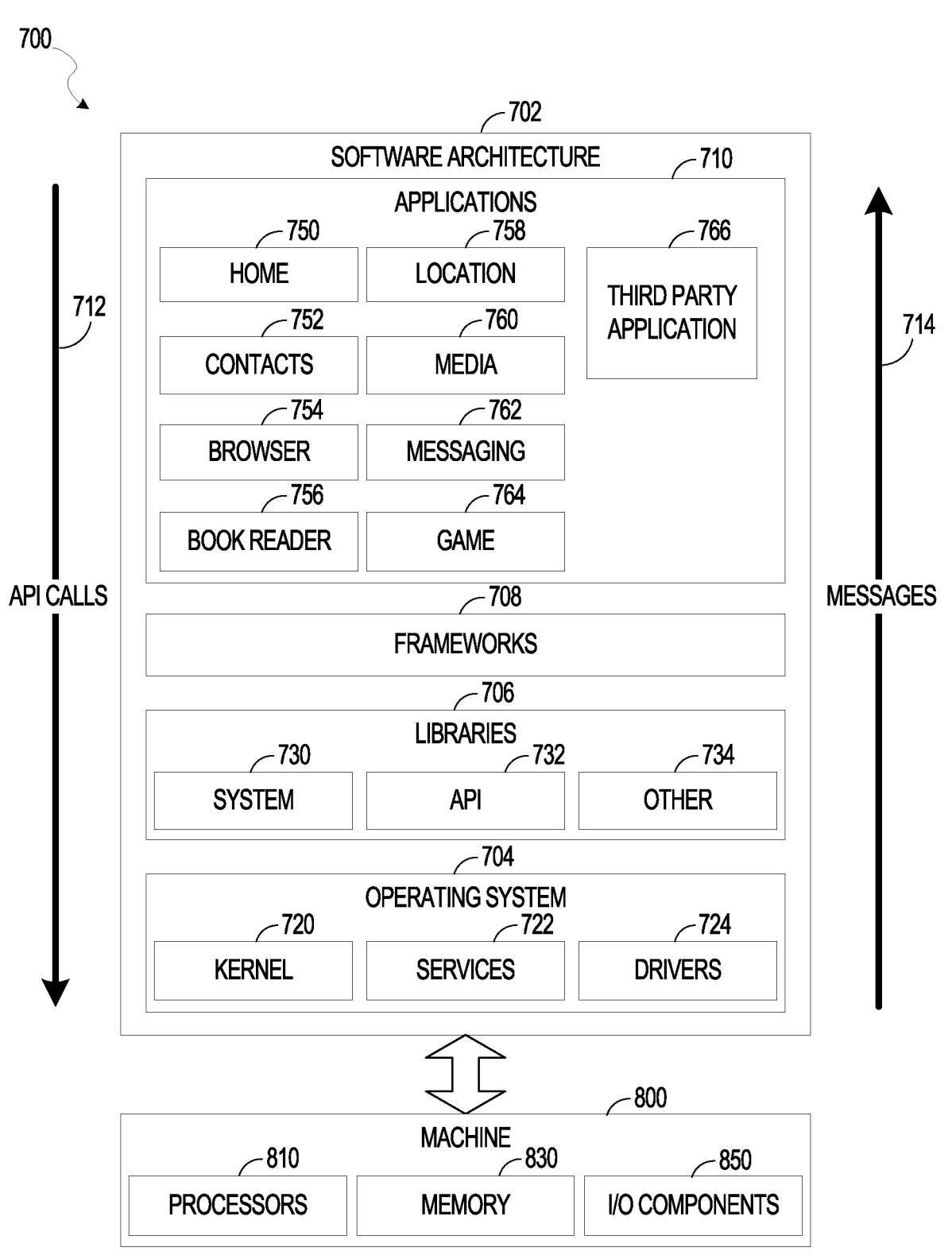
FIG. 7 is a block diagram illustrating an architecture of software, which can be installed on any one or more of the devices described above.

FIG. 7 is a block diagram 700 illustrating a software architecture 702, which can be installed on any one or more of the devices described above. FIG. 7 is merely a non-limiting example of a software architecture, and it will be appreciated that many other architectures can be implemented to facilitate the functionality described herein. In various embodiments, the software architecture 702 is implemented by hardware such as a machine 800 of FIG. 8 that includes processors 810, memory 830, and input/output (I/O) components 850. In this example architecture, the software architecture 702 can be conceptualized as a stack of layers where each layer may provide a particular functionality. For example, the software architecture 702 includes layers such as an operating system 704, libraries 706, frameworks 708, and applications 710. Operationally, the applications 710 invoke API calls 712 through the software stack and receive messages 714 in response to the API calls 712, consistent with some embodiments.

In various implementations, the operating system 704 manages hardware resources and provides common services. The operating system 704 includes, for example, a kernel 720, services 722, and drivers 724. The kernel 720 acts as an abstraction layer between the hardware and the other software layers, consistent with some embodiments. For example, the kernel 720 provides memory management, processor management (e.g., scheduling), component management, networking, and security settings, among other functionality. The services 722 can provide other common services for the other software layers. The drivers 724 are responsible for controlling or interfacing with the underlying hardware, according to some embodiments. For instance, the drivers 724 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 706 provide a low-level common infrastructure utilized by the applications 710. The libraries 706 can include system libraries 730 (e.g., C standard library) that can provide functions such as memory allocation functions, string manipulation functions, mathematic functions, and the like. In addition, the libraries 706 can include API libraries 732 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 706 can also include a wide variety of other libraries 734 to provide many other APIs to the applications 710.

The frameworks 708 provide a high-level common infrastructure that can be utilized by the applications 710, according to some embodiments. For example, the frameworks 708 provide various graphical user interface (GUI) functions, high-level resource management, high-level location services, and so forth. The frameworks 708 can provide a broad spectrum of other APIs that can be utilized by the applications 710, some of which may be specific to a particular operating system 704 or platform.

In an example embodiment, the applications 710 include a home application 750, a contacts application 752, a browser application 754, a book reader application 756, a location application 758, a media application 760, a messaging application 762, a game application 764, and a broad assortment of other applications, such as a third-party application 766. According to some embodiments, the applications 710 are programs that execute functions defined in the programs. Various programming languages can be employed to create one or more of the applications 710, structured in a variety of manners, such as object-oriented programming languages (e.g., Objective-C, Java, or C++) or procedural programming languages (e.g., C or assembly language). In a specific example, the third-party application 766 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 766 can invoke the API calls 712 provided by the operating system 704 to facilitate functionality described herein.

Figure 8:
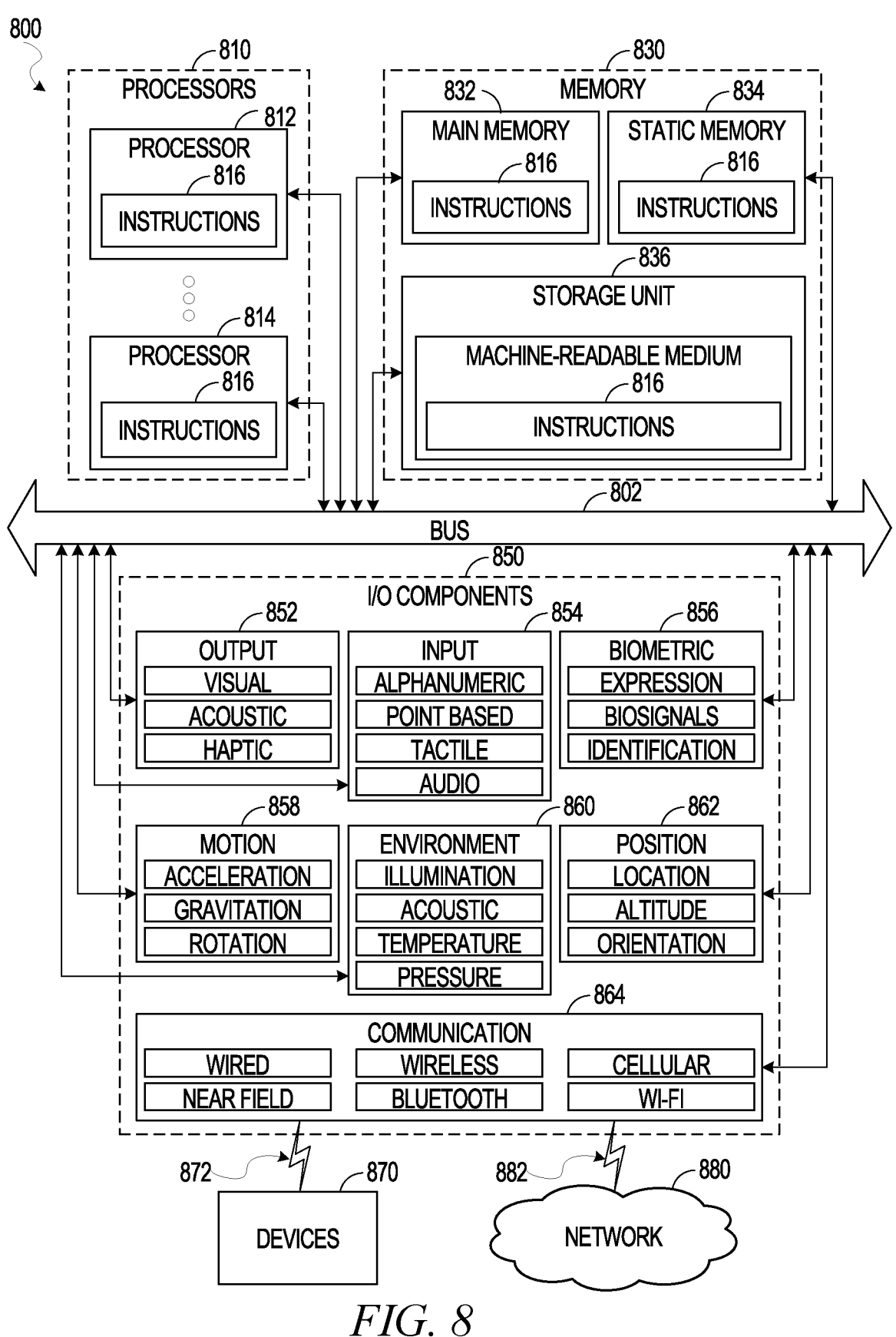
FIG. 8 illustrates a diagrammatic representation of a machine in the form of a computer system within which a set of instructions may be executed for causing the machine to perform any one or more of the methodologies discussed herein, according to an example embodiment.

FIG. 8 illustrates a diagrammatic representation of a machine 800 in the form of a computer system within which a set of instructions may be executed for causing the machine 800 to perform any one or more of the methodologies discussed herein, according to an example embodiment. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. For example, the instructions 816 may cause the machine 800 to execute the method of FIG. 6. Additionally, or alternatively, the instructions 816 may implement FIGS. 1-6 and so forth. The instructions 816 transform the general, non-programmed machine 800 into a particular machine 800 programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 may include processors 810, memory 830, and I/O components 850, which may be configured to communicate with each other such as via a bus 802. In an example embodiment, the processors 810 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 812 and a processor 814 that may execute the instructions 816. The term "processor" is intended to include multi-core processors that may comprise two or more independent processors (sometimes referred to as "cores") that may execute instructions 816 contemporaneously. Although FIG. 8 shows multiple processors 810, the machine 800 may include a single processor 812 with a single core, a single processor 812 with multiple cores (e.g., a multi-core processor 812), multiple processors 812, 814 with a single core, multiple processors 812, 814 with multiple cores, or any combination thereof.

The memory 830 may include a main memory 832, a static memory 834, and a storage unit 836, each accessible to the processors 810 such as via the bus 802. The main memory 832, the static memory 834, and the storage unit 836 store the instructions 816 embodying any one or more of the methodologies or functions described herein. The instructions 816 may also reside, completely or partially, within the main memory 832, within the static memory 834, within the storage unit 836, within at least one of the processors 810 (e.g., within the processor's cache memory), or any suitable combination thereof, during execution thereof by the machine 800.

The I/O components 850 may include a wide variety of components to receive input, provide output, produce output, transmit information, exchange information, capture measurements, and so on. The specific I/O components 850 that are included in a particular machine will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion, and the grouping is in no way limiting. In various example embodiments, the I/O components 850 may include output components 852 and input components 854. The output components 852 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 850 may include biometric components 856, motion components 858, environmental components 860, or position components 862, among a wide array of other components. For example, the biometric components 856 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 858 may include acceleration sensor components (e.g., accelerometer), gravitation sensor components, rotation sensor components (e.g., gyroscope), and so forth. The environmental components 860 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 862 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 850 may include communication components 864 operable to couple the machine 800 to a network 880 or devices 870 via a coupling 882 and a coupling 872, respectively. For example, the communication components 864 may include a network interface component or another suitable device to interface with the network 880. In further examples, the communication components 864 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 870 may be another machine or any of a wide variety of peripheral devices (e.g., coupled via a USB).

Moreover, the communication components 864 may detect identifiers or include components operable to detect identifiers. For example, the communication components 864 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 864, such as location via Internet Protocol (IP) geolocation, location via Wi-Fi® signal triangulation, location via detecting an NFC beacon signal that may indicate a particular location, and so forth.

The various memories (e.g., 830, 832, 834, and/or memory of the processor(s) 810) and/or the storage unit 836 may store one or more sets of instructions 816 and data structures (e.g., software) embodying or utilized by any one or more of the methodologies or functions described herein. These instructions (e.g., the instructions 816), when executed by the processor(s) 810, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 880 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 816 may be transmitted or received over the network 880 using a transmission medium via a network interface device (e.g., a network interface component included in the communication components 864) and utilizing any one of a number of well-known transfer protocols (e.g., Hypertext Transfer Protocol (HTTP)). Similarly, the instructions 816 may be transmitted or received using a transmission medium via the coupling 872 (e.g., a peer-to-peer coupling) to the devices 870. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 816 for execution by the machine 800, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
at least one hardware processor; and
a computer-readable medium storing instructions that, when executed by the at least one hardware processor, cause the at least one hardware processor to perform operations comprising:
periodically sending a request from a restricted content manager service to a public content manager service to check for packages shared with a tenant of a tenant management service associated with the restricted content manager service, the public content manager service having a repository for storage of packages and not directly communicating with the tenant management service;
in response to the periodic sending, receiving tenant metadata for one or more tenants with which the public content manager service determines one or more packages have been shared, the one or more tenants associated with the restricted content manager service;
obtaining, by the restricted content manager service, tenant details from the tenant management service, based on the tenant metadata; and
causing, by the restricted content manager service, the public content manager service to update sharing permissions for one or more tenants corresponding to the tenant details by passing the tenant details to the public content manager service.

2. The system of claim 1, wherein the public content manager service stores, for a shared package, package details and tenant details corresponding to one or more tenants with which the package is to be shared in an interim table.

3. The system of claim 2, wherein the causing results in the public content manager service updating a permission table with the tenant details.

4. The system of claim 3, wherein the causing further results in the public content manager service clearing any entries associated with the package details from the interim table.

5. The system of claim 1, wherein the tenant details include a fully qualified domain name (FQDN) of any tenant with which the packages are to be shared.

6. The system of claim 1, wherein the tenant metadata includes a uniform unique identifier (UUID) for any tenant with which the packages are to be shared.

7. The system of claim 2, wherein the interim table is stored in an in-memory database.

8. A method comprising:
periodically sending a request from a restricted content manager service to a public content manager service to check for packages shared with a tenant of a tenant management service associated with the restricted content manager service, the public content manager service having a repository for storage of packages and not directly communicating with the tenant management service;
in response to the periodic sending, receiving tenant metadata for one or more tenants with which the public content manager service determines one or more packages have been shared, the one or more tenants associated with the restricted content manager service;

obtaining, by the restricted content manager service, tenant details from the tenant management service, based on the tenant metadata; and causing, by the restricted content manager service, the public content manager service to update sharing permissions for one or more tenants corresponding to the tenant details by passing the tenant details to the public content manager service.

9. The method of claim 8, wherein the public content manager service stores, for a shared package, package details and tenant details corresponding to one or more tenants with which the package is to be shared in an interim table.

10. The method of claim 9, wherein the causing results in the public content manager service updating a permission table with the tenant details.

11. The method of claim 10, wherein the causing further results in the public content manager service clearing any entries associated with the package details from the interim table.

12. The method of claim 8, wherein the tenant details include a fully qualified domain name (FQDN) of any tenant with which the packages are to be shared.

13. The method of claim 8, wherein the tenant metadata includes a uniform unique identifier (UUID) for any tenant with which the packages are to be shared.

14. The method of claim 9, wherein the interim table is stored in an in-memory database.

15. A non-transitory machine-readable medium storing instructions which, when executed by one or more processors, cause the one or more processors to perform operations comprising:

periodically sending a request from a restricted content manager service to a public content manager service to check for packages shared with a tenant of a tenant management service associated with the restricted content manager service, the public content manager service having a repository for storage of packages and not directly communicating with the tenant management service;

in response to the periodic sending, receiving tenant metadata for one or more tenants with which the public content manager service determines one or more packages have been shared, the one or more tenants associated with the restricted content manager service;

obtaining, by the restricted content manager service, tenant details from the tenant management service, based on the tenant metadata; and causing, by the restricted content manager service, the public content manager service to update sharing permissions for one or more tenants corresponding to the tenant details by passing the tenant details to the public content manager service.

16. The non-transitory machine-readable medium of claim 15, wherein the public content manager service stores, for a shared package, package details and tenant details corresponding to one or more tenants with which the package is to be shared in an interim table.

17. The non-transitory machine-readable medium of claim 16, wherein the causing results in the public content manager service updating a permission table with the tenant details.

18. The non-transitory machine-readable medium of claim 17, wherein the causing further results in the public content manager service clearing any entries associated with the package details from the interim table.

19. The non-transitory machine-readable medium of claim 15, wherein the tenant details include a fully qualified domain name (FQDN) of any tenant with which the packages are to be shared.

20. The non-transitory machine-readable medium of claim 15, wherein the tenant metadata includes a uniform unique identifier (UUID) for any tenant with which the packages are to be shared.

* * * * *